Sept. 2, 1924.
C. P. ASTROM
1,506,803
METHOD AND APPARATUS FOR RECOVERING HEAT
Filed March 19, 1919     2 Sheets-Sheet 2
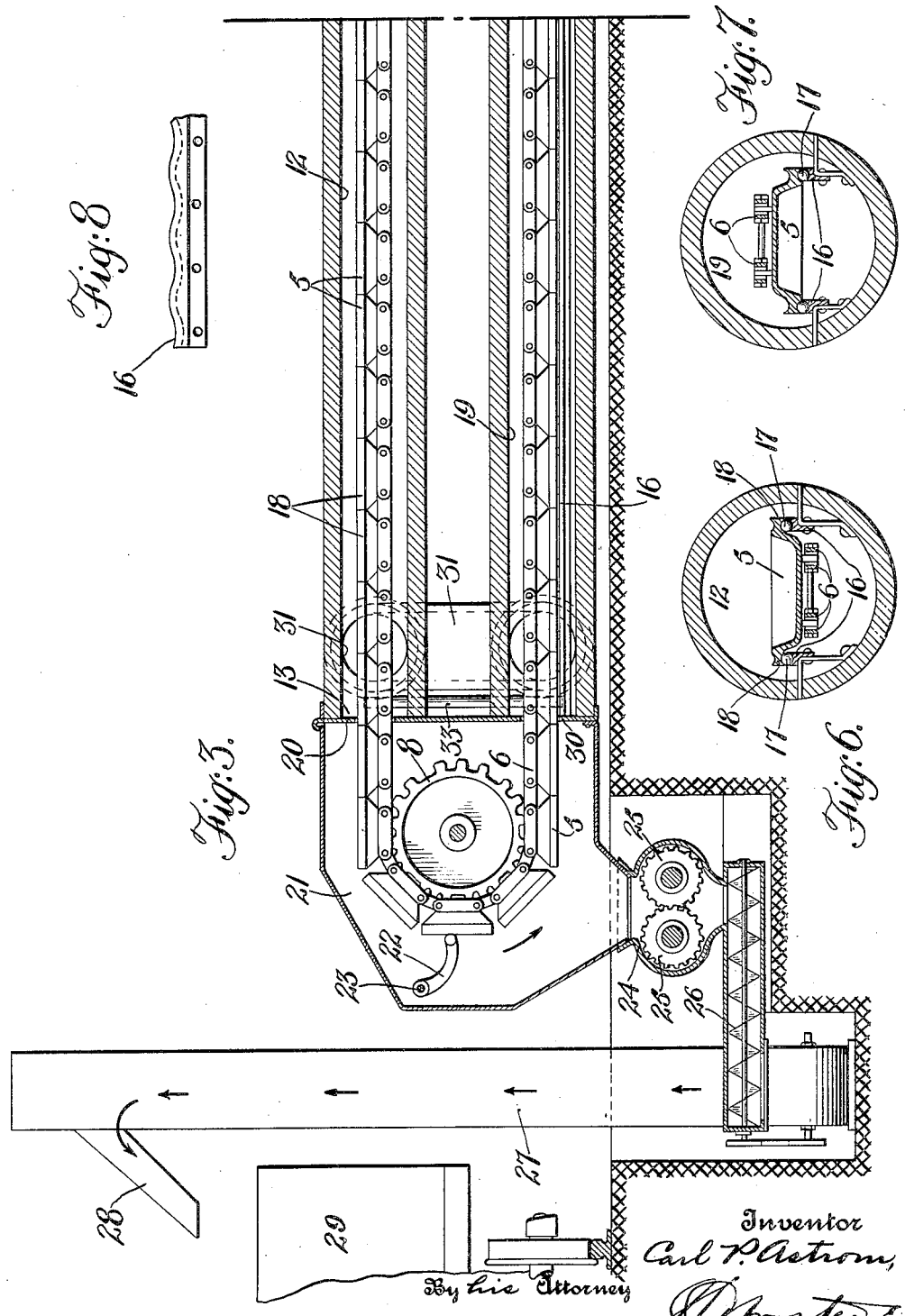
Inventor
Carl P. Astrom,
By his Attorney Patented Sept. 2, 1924.

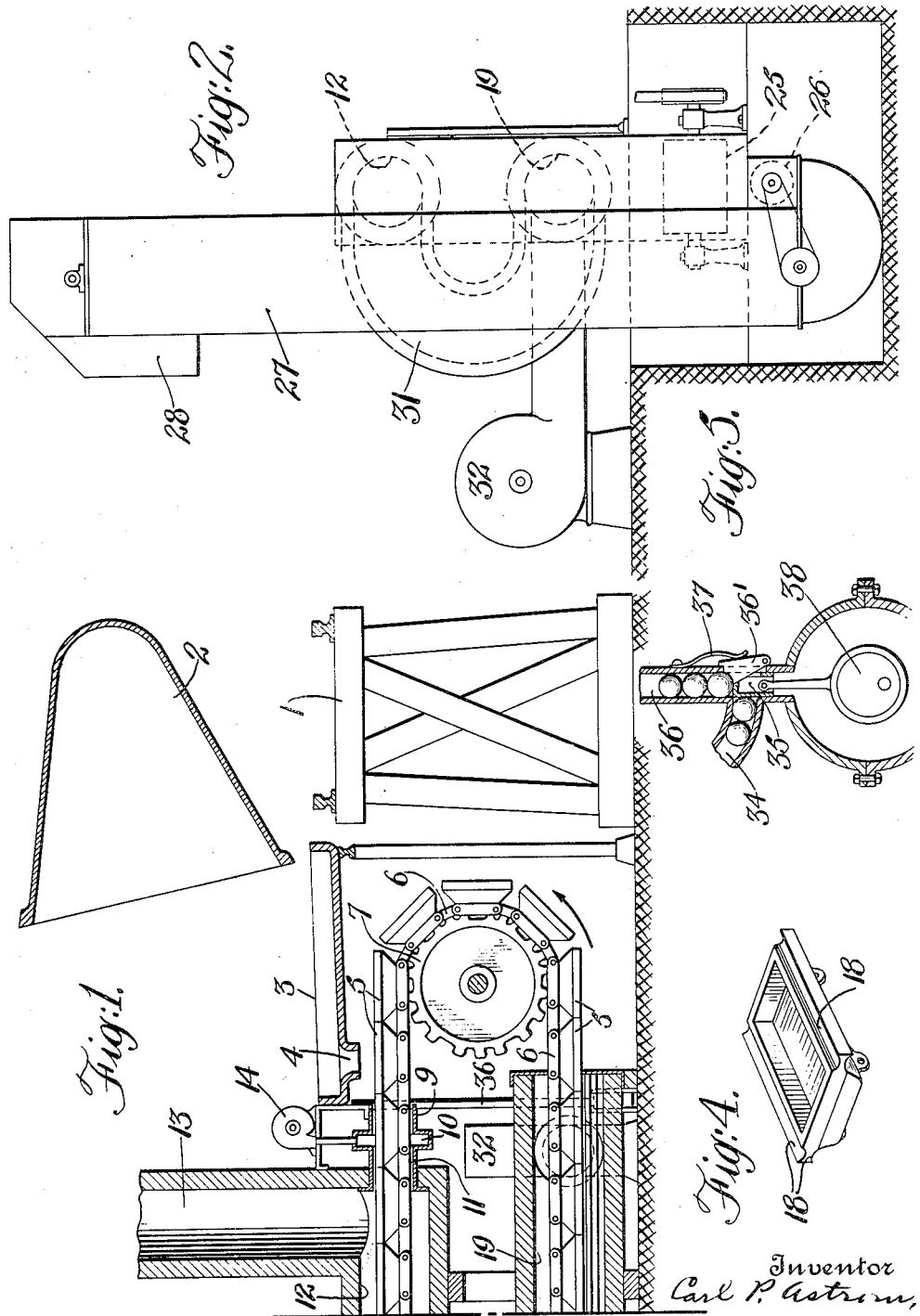

1,506,803

UNITED STATES PATENT OFFICE.

CARL P. ASTROM, OF EAST ORANGE, NEW JERSEY.

METHOD AND APPARATUS FOR RECOVERING HEAT.

Application filed March 19, 1919. Serial No. 283,611.

*To all whom it may concern:*

Be it known that I, CARL P. ASTROM, a citizen of the United States, and a resident of East Orange, in the county of Essex and State of New Jersey, have invented certain new and useful Improvements in Methods and Apparatus for Recovering Heat, of which the following is a specification.

This invention relates to method and apparatus for recovering heat, and is particularly intended for the recovery of heat from slag, although the principles of the invention are applicable to the recovery of heat from castings or other heated materials which permit of being handled in large quantities by mechanical means.

Various efforts have been made for the recovery of heat from slag, which is the most common and abundant material in large works wherein heat is lost. So far as I am aware, there is little or no satisfactory recovery of heat obtained at the present time from either the slag or castings in blast furnace or foundry plants. It has been proposed to use waste heat in slag for heating water, or for generating low pressure steam, the hot water to be used for heating or boiler feed, and the low pressure steam for heating or in low pressure turbine plants. The effect of discharging molten slag into water is to divide the slag into very small particles, which are either carried away and used for filling or in some instances combined with a binder and used for briquettes, or else used for cement manufacture. In cooling slag in water, objectionable elements in the slag are taken up by the water, usually render it unsuitable for boiler feed and practically restricting it to indirect heating. Moreover, the steam given off is equally objectionable to be used in machinery because of its corrosive qualities derived from the slag. It is found that slag is more useful if not obtained in finely divided condition, but so far as I am aware, no satisfactory method and apparatus for obtaining slag in this form and recovering the heat has yet been devised.

According to this invention, I eliminate the disadvantage of attempting to recover waste heat through the agency of water or steam and accomplish better results by causing the waste heat to be taken up by air in such manner that the air is not itself impaired either as a supporter of combustion or for heating. By this invention, the air is maintained clean and can be used either for blast in a blast furnace, or for heating blast stoves, or for combustion with coal, oil or gas under furnaces, or in gas engines, or for heating water or producing steam in boilers, with a very large percentage of saving.

In carrying out the invention the slag or other hot material is cast on a conveyer moving through an air conduit, cool air being blown into this conduit and taking up heat both from the conveyor and the hot material carried thereby, the material thence being discharged and delivered at the point where desired for use. For example, slag will be tapped out of a blast furnace into a cinder car and carried to a hopper discharging on to the conveyer moving through the air conduit, the conveyer in this example being in the form of molds in which the slag sets in large slabs. When the slag has set and has been sufficiently cooled it passes out of the direct air conduit into a dust and discharging chamber wherein the molds discharge the slabs into a crusher which breaks up the slabs into pieces suitable for road-metal, ballast, etc. The slag is then discharged from this chamber without loss of air and the empty conveyer re-enters the air conduit at another portion and returns to the point of charging. Cool air is blown into the conduit by a blower, and one portion of the conduit is connected with the other without passing through the dust chamber so that the air is first heated by the empty conveyer and then by the hot material to a temperature of 1200° F. or more. It is difficult if not impossible to blow hot air of this high temperature because blowers have not been designed which will operate on hot air, but the initial blowing pressure of the cool air can be made sufficient to force the air through the entire apparatus and thence to the point where it is to be utilized, since the flow of heated air will be assisted by convection even though it is at such high temperature as not to be capable of being mechanically accelerated. As shown herein, the slabs are intended to be broken up into form suitable for ballast, filling, etc, but if desired it is possible to change the form of the molds so that bricks will be cast ready for the usual purposes to which slab bricks are applied, with a large recovery of heat. In this form, the bricks would preferably be discharged from the conveyer outside the main air conduit to eliminate trouble from dust in the air, and fed out of the discharge chamber by a somewhat different form of mechanism than that herein illustrated without entailing loss of air through the discharge. A further feature of the invention resides in a conveyer mechanism running on loose balls or rollers and embodying a novel form of ball or roller return mechanism, since mechanism of this character is desirable owing to the large masses to be handled. The invention with reference to a preferred form will be described in connection with the accompanying drawings, wherein—

Figure 1 is an elevation partly in section of the conveyer charging end,

Figure 2 is an end elevation,

Figure 3 is a side elevation partly in section of the discharge end,

Figure 4 is a perspective view of one of the molds,

Figure 5 is a detail of the ball pump,

Figure 6 is a cross section of the top of the conduit,

Figure 7 is a cross section of the bottom conduit and

Figure 8 is a detail of one of the rails.

1 represents a railroad trestle on which cinder cars run back and forth from the blast furnace each car consisting of an end frame carrying a dumping ladle 2 operated mechanically to discharge the slag into a hopper 3 having a spout 4 which discharges slag into the molds 5 connected by link 6 and running over power driven sprockets 7, 8. After the molds are filled they run through a diaphragm or wall 9 into an auxiliary air chamber 10 which communicates by passage 11 to the upper or hot conduit 12 having the discharge passage 13. The air chamber 10 is supplied with pressure by a small blower 14 so as to maintain therein a pressure equal to or slightly exceeding that in the conduit 12, threby preventing escape of hot air from conduit 12 through the diaphragm 9. The conduit 12 can be of any desired shape but it is the cheapest to build it round as shown in Figure 6, it being enclosed by heat insulating material so that there is little or no heat loss through the slots of the conduit. Extending longitudinally of the conduit 12 are grooved rails 16, preferably of the wavy form as shown in Figure 8, and carrying bearing balls 17. The molds 5 have side wings 18 grooved at top and bottom as shown in Figure 6 so that when the molds are running through the upper chamber the lower grooves rest on the balls which roll along in the track 16 with the molds, while when the molds are returning through the lower conduit 19, the returning balls roll on the tracks 16 therein and the inverted molds rest on the balls as shown in Figure 8. The track 16 may be made wavy as shown in Figure 8 so that a mold will always rest on at least three balls, thus one ball will not continuously carry the load through the entire length of the conduit, but will be free when in the depressions and loaded when on the high points of the track. Since the conduit may in a large plant be several hundred feet long, the question of friction becomes important, and on account of the extreme heat oil bearings cannot be used. These balls will be cheap cast iron or steel unaffected by the heat and will largely reduce the friction in a large moving mass. The upper conduit 12 is of such length as to permit the slag or other material to set and become practically cool before passing out of the conduit through the diaphragm 20 into the discharging and dust chamber 21. The diaphragms 9 and 20 will preferably swing like doors so that high spots on the castings will pass through, the doors then swinging back to former vertical position to maintain the seal, as it is very important in this invention that the hot air conduit 12 be sealed at both ends. The slabs may be broken just before discharging from the mold by a mechanically driven hammer 22 mounted on shaft 23, the broken pieces then falling into a hopper 24 and passing through crushing rolls 25 to a screw conveyer 26 and a bucket elevator 27 to discharge through a chute 28 into a car 29. The dust chamber 21 is closed at the bottom by a diaphragm 30 where the empty molds pass through into the lower conduit 19 to return to the starting point. The lower conduit is connected with the upper conduit by a by-pass 31 without going through the dust chamber 21.

The lower conduit is supplied with cool air near its front end by blower 32, which will give sufficient pressure, together with convection, to cause the necessary rapidity of flow of air through the apparatus, thus obviating the difficulties involved in using a blower in the hot air end.

Although the balls could easily be guided around the sprockets, I prefer to discharge the balls from the upper track to the lower track just before the molds pass the diaphragm 20 through a pipe 33 on each side, the balls falling through this pipe and running between the mold extensions 18 and the rail 16 in lower conduit 19. When the balls get to the other end they roll from the track 16 in conduit 19 into a pipe 34, and are thence lifted one by one by a reciprocating piston 35 up through a vertical pipe 36 and fed under the extensions 18 of the molds before they pass through the diaphragm 9. The piston 35 is slotted to receive a latch 36' controlled by a spring 37 so that the latch drops behind the ball just lifted to hold it while the piston is withdrawing to allow another ball to fall in. The piston 35 may be operated by an eccentric 38.

This apparatus overcomes a number of practical difficulties, first in carrying hot molds in a hot atmosphere as easily as possible without requiring oil bearings. Second, preventing loss of heated air where the molds are charged, since the air in the conduit is too hot to be handled with any ordinary fan or blower. Third, the separation of the discharging point in a separate chamber keeps the heated air free from dust which if allowed to mix with the heated air would entirely destroy its usefulness for some purposes, and impair its usefulness for many others. The discharging end can be provided with a similar auxiliary air chamber similar to 10, so as to replace leakage outside and prevent dust from entering the heated air conduit, but it is not ordinarily considered necessary since with the form shown, although there will not be free communication between the dust chamber 21 and the conduit space 12, there will be the same or practically the same air pressure, so that no dust will enter the air conduit. Under usual conditions the air pressure in the conduit will be slightly higher than in the dust chamber, it being observed that the screw conveyer practically forms air seal at the lower end. The power connections for the crusher conveyer and elevator, and other parts are not shown as these will vary according to the particular conditions. While it is possible with this apparatus to heat the air so high that it cannot be handled by blowers, it will be understood that this entire plant can be operated on a vacuum system with a large recovery of heat if desired. This would be in instances where an exhauster is placed in a boiler flue or other piece of apparatus supplied with hot air from this apparatus, and thus drawing the air through either with or without a cool air blower 32. If used in this way, an air seal will be provided at the dumping end to prevent the dust from being drawn in to the heated air, which seal could be similar to auxiliary chamber 10 and blower 14. The seal at the pouring end would be under the same vacuum as the outlet 13, and maintained in the same manner.

From the foregoing description, the nature and advantages of the invention will be fully understood, and I do not restrict myself to the particular details herein described except as required by the appended claims.

What is claimed, is:

1. The method of recovering heat consisting in charging a travelling conveyer with heated material, passing said charged conveyer into and through a conduit containing a current of air and sealed against escape of heated air where the conveyer enters and leaves, and discharging the heated air from said conduit to a heat utilizing device.

2. The method of recovering heat consisting in charging a travelling conveyer with molten material, passing said charged conveyer into and through a conduit containing a current of air and sealed against escape of heated air where the conveyer enters and leaves, and discharging the heated air from said conduit to a heat utilizing device.

3. The method of recovering heat which consists in casting molten material in a series of molds traveling in a conduit, passing a blast through said chamber to withdraw heat from said castings, discharging the molds exterior of the conduit without escape of heated blast, and supplying the heated blast to a heat utilizing device.

4. The method of recovering heat which consists in casting molten material in a series of molds traveling in a conduit, passing a blast through said conduit to withdraw heat from said castings, discharging the molds exterior of the conduit and returning them through another portion thereof, and supplying the heated blast to a heat utilizing device.

5. The method of recovering heat which consists in casting slag on a conveyor moving through an air conduit, charging and discharging the conveyor externally of said conduit while preventing the entry of dust thereinto and the escape of heated air therefrom, blowing cool air through said conduit to be heated by the slag, and utilizing the heated air.

6. The method of recovering heat which consists in casting slag on a conveyer, moving the conveyer through an air seal into an air conduit, discharging the conveyer without loss of air from the conduit, blowing cool air into the conduit, and utilizing the heated air blast.

7. The method of recovering heat which consists in casting slag on a continuous travelling conveyer moving through an air conduit, discharging the conveyer and crushing the cast slag outside the conduit, blowing cool air into the conduit, and utilizing the heated air blast.

8. The combination with a conduit and means for forcing air therethrough, of a conveyer moving through said conduit, means for casting molten material on said conveyer, and an air seal between the casting point and the conduit.

9. The combination with a conduit and means for forcing air therethrough, of a conveyer moving through said conduit away from the air outlet, means for casting molten material on said conveyer, a discharge chamber outside the conduit containing means for discharging the solidified material from the conveyer, the conveyer then entering another portion of the conduit and initially heating the air in the conduit, and air sealing means where the conveyer enters and leaves the conduit.

10. The combination with a conduit and means for blowing cool air therethrough, of a conveyer for hot material moving through said conduit oppositely to the air current, a discharge chamber separated from the conduit and receiving and discharging the loaded conveyer, the conveyer then returning to the starting point, means for loading the conveyer with hot material, and air sealing means preventing escape of heated air.

11. The combination with a conveyer, of means for casting molten slag thereon, an air conduit through which the loaded conveyer passes while cooling, a closed chamber outside the air conduit into which the conveyer discharges, means for breaking the discharged slag and discharging it without loss of air from the conduit, means for blowing cool air into the conduit, and air sealing means preventing escape of heated air.

12. In combination, an air conduit and blowing means, a conveyer moving in the conduit, means for supplying hot slag to the conveyer, a discharge chamber separated from the conduit for receiving the cooled slag, a constricted opening between said conduit and said discharge chamber for transferring the slag therethrough, and means for discharging the slag from said chamber without loss of heated air.

13. In combination, an air conduit and blowing means, a conveyer moving in the conduit, means for supplying hot slag to the conveyer, an air seal through which the hot slag passes, a discharge chamber separated from the conduit for receiving the cooled slag, and means for discharging the slag from said chamber without loss of heated air.

14. The combination with slag pouring means, of an air seal, means for passing the hot slag therethrough into and through an air conduit while cooling, and means for discharging and crushing the slag into pieces.

15. The combination with slag pouring means, of an air seal, a shallow pair conveyer receiving the molten slag and passing through said seal into an air conduit, an air seal at the other end of the conduit through which the conveyer passes to discharge, and means for discharging the slabs.

16. In a heat recovering apparatus embodying a conveyer for heated material moving into and out of an air conduit, an air seal comprising a chamber and means for maintaining pressure therein proportioned relatively to the pressure in said conduit to prevent escape of air from the conduit.

17. In a heat recovering apparatus embodying a conveyer for heated material moving into and out of an air conduit, a chamber in which the loaded conveyer is discharged having means preventing contamination of the air in the conduit by dust in the chamber.

18. The combination with a tempering chamber, of a conveyer travelling in and out of the chamber, means for passing a tempering fluid through the chamber in contact with the conveyor, means for discharging the conveyor outside the chamber, and a hammer for breaking the contents of the conveyor in discharging the same.

19. The combination with a tempering chamber, of a conveyor travelling in and out thereof, a diaphragm for said tempering chamber where the conveyor passes through the wall of said chamber, an automatic hammer outside the chamber for breaking the contents of the conveyor, means also outside the chamber for emptying the conveyor, and a crusher located adjacent the emptying means for further breaking up the contents of the conveyor.

20. The combination with a tempering and a main fluid pressure chamber provided with an aperture, of a conveyor passing through said aperture, an auxilliary chamber around said aperture, and means for supplying fluid pressure to the auxilliary chamber to prevent the escape of fluid from the main chamber.

Signed at New Yory city, in the county of New York and State of New York, this 17th day of March, A. D. 1919.

CARL P. ASTROM.